(12) United States Patent
Norton et al.

(10) Patent No.: US 9,738,132 B2
(45) Date of Patent: Aug. 22, 2017

(54) RIDE PERFORMANCE OPTIMIZATION IN AN ACTIVE SUSPENSION SYSTEM

(71) Applicant: FORD GLOBAL TECHNOLOGIES, LLC, Dearborn, MI (US)

(72) Inventors: Russ Lee Norton, Brownstown Township, MI (US); Benjamin Bulat, Plymouth, MI (US); William Gregory Suter, Farmington Hills, MI (US); Albert Chenouda Salib, Troy, MI (US); David Michael Russell, Ann Arbor, MI (US); Uwe Hoffmann, Leverkusen (DE); Marc Suermann, Duisburg (DE); Darrell Erick Butler, Macomb, MI (US); Louis Joseph Jamail, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/928,071

(22) Filed: Oct. 30, 2015

(65) Prior Publication Data

US 2016/0046166 A1 Feb. 18, 2016

Related U.S. Application Data

(63) Continuation-in-part of application No. 14/559,643, filed on Dec. 3, 2014, now Pat. No. 9,321,320, which
(Continued)

(51) Int. Cl.
*B60G 17/0165* (2006.01)
*B60G 17/018* (2006.01)
(Continued)

(52) U.S. Cl.
CPC ....... *B60G 17/018* (2013.01); *B60G 17/0165* (2013.01); *B60G 17/06* (2013.01);
(Continued)

(58) Field of Classification Search
CPC ............................ B60G 17/018; B60G 17/016
See application file for complete search history.

(56) References Cited

U.S. PATENT DOCUMENTS

| 4,741,554 A | 5/1988 | Okamoto |
| 4,804,203 A | 2/1989 | Glab et al. |

(Continued)

FOREIGN PATENT DOCUMENTS

| EP | 0318139 B1 | 9/1988 |
| JP | 04169316 A | 6/1992 |

OTHER PUBLICATIONS

Notice of Allowance dated Dec. 18, 2015 in U.S. Appl. No. 14/559,643.
(Continued)

*Primary Examiner* — Yuri Kan
(74) *Attorney, Agent, or Firm* — Jones Robb, PLLC; Raymond L. Coppiellie (57) ABSTRACT

An active vehicle suspension system includes an active damping mechanism operatively coupled to a vehicle wheel and configured for controlling a damping force applied to the wheel responsive to a control signal. A controller is operatively coupled to the damping mechanism and configured for generating a control signal to the damping mechanism responsive to velocity of the wheel in a downward vertical direction. At least one of a timer threshold and velocity threshold, used to determine whether a vehicle wheel has encountered a depression in a road surface, may be varied on a basis of a speed of the vehicle. A damping mechanism for a rear wheel of a vehicle may be controlled
(Continued)

on a basis of how a damping mechanism for a front wheel is controlled.

22 Claims, 5 Drawing Sheets

Related U.S. Application Data is a continuation of application No. 13/531,997, filed on Jun. 25, 2012, now Pat. No. 8,918,253.

(51) Int. Cl.
    *B60G 17/016* (2006.01)
    *B60G 17/06* (2006.01)
    *B60G 17/08* (2006.01)

(52) U.S. Cl.
    CPC ........ *B60G 17/08* (2013.01); *B60G 2400/202* (2013.01); *B60G 2400/98* (2013.01); *B60G 2401/902* (2013.01); *B60G 2500/10* (2013.01); *B60G 2500/106* (2013.01); *B60G 2600/02* (2013.01); *B60G 2800/912* (2013.01)

(56) References Cited

U.S. PATENT DOCUMENTS

| | | | |
|---|---|---|---|
| 4,825,370 A | 4/1989 | Kurosawa | |
| 4,838,574 A | 6/1989 | Baraszu | |
| 5,162,996 A | 11/1992 | Matsumoto et al. | |
| 5,429,384 A | 7/1995 | Takahashi et al. | |
| 5,467,280 A * | 11/1995 | Kimura | B60G 17/016 280/5.515 |
| 5,642,899 A | 7/1997 | Inoue et al. | |
| 5,781,873 A | 7/1998 | Sasaki | |
| 5,979,885 A * | 11/1999 | Katsuda | B60G 17/0165 188/266.1 |
| 6,513,384 B1 * | 2/2003 | Quibel | E02D 1/022 73/146 |
| 8,918,253 B2 * | 12/2014 | Norton | B60G 17/018 701/37 |
| 2005/0113998 A1 | 5/2005 | Kim | |
| 2006/0243548 A1 | 11/2006 | Stein et al. | |
| 2008/0319609 A1 | 12/2008 | Poilbout | |
| 2009/0062983 A1 | 3/2009 | Knoll et al. | |
| 2009/0319123 A1 | 12/2009 | Nardi et al. | |

OTHER PUBLICATIONS

Chinese Office Action for Application No. 201310256374.5 dated Jul. 5, 2016.
Non-Final Office Action dated Jul. 19, 2013 in U.S. Appl. No. 13/531,997.
Final Office Action dated Dec. 31, 2013 in U.S. Appl. No. 13/531,997.
Notice of Allowance dated Aug. 15, 2014 in U.S. Appl. No. 13/531,997.

* cited by examiner

RIDE PERFORMANCE OPTIMIZATION IN AN ACTIVE SUSPENSION SYSTEM

CROSS REFERENCE TO RELATED APPLICATIONS

This application is a continuation-in-part of application Ser. No. 14/559,643, filed Dec. 3, 2014, which is a continuation of application Ser. No. 13/531,997, filed Jun. 25, 2012 (now U.S. Pat. No. 8,918,253), the contents of each of which is incorporated herein by reference in its entirety.

BACKGROUND

The embodiments of the present disclosure relate to active vehicle suspension systems incorporating continuously variable or multistep suspension dampers, and to methods for controlling such systems.

Vehicles may incorporate active or adaptive suspension systems to actively control the vertical movements of the vehicle wheels rather than allowing such movements to be determined entirely by interactions with the road surface. In order to maximize ride comfort in such vehicles, it is usually desirable to maintain the damping levels in vehicle shock absorbers at a relatively low value.

However, when a vehicle wheel encounters a depression (such as a pothole) in the road surface, a lower damping level permits the wheel to fall relatively rapidly into the pothole. Generally, the deeper the wheel falls into the hole, the greater the impact forces generated by the wheel impacting a far side of the hole just prior to rising out of the hole. With the wheel damping level at a relatively low value, these impact forces are transmitted through the vehicle suspension to the remainder of the vehicle, adversely affecting ride quality.

While increasing the level of wheel damping would reduce the impact forces transmitted to the vehicle and suspension, this would adversely affect ride quality when the vehicle is traveling on a normal, level road surface. Thus, it is desirable to increase damping levels only when a pothole is encountered, while maintaining the damping levels at the relatively lower value when the wheel is riding on a level road surface.

SUMMARY

In accordance with one aspect of the present disclosure, a method of controlling a vehicle suspension for a wheel via a controller is provided. The method comprises repeatedly calculating a vertical velocity of the wheel until the vertical velocity exceeds a first velocity threshold; in response to the vertical velocity exceeding the first velocity threshold, initiating a timer while repeatedly recalculating the vertical velocity of the wheel until the recalculated vertical velocity exceeds a second velocity threshold; and in response to the recalculated vertical velocity exceeding the second velocity threshold before the timer exceeds a first time threshold, increasing a damping level of the suspension. At least one of the velocity thresholds and the first time threshold is varied on a basis of a speed of the vehicle.

In accordance with another aspect of the present disclosure, a vehicle suspension system is provided. The vehicle suspension system comprises an active damping mechanism operatively coupled to a vehicle wheel and a controller operatively coupled to the active damping mechanism. The controller is configured to repeatedly calculate a vertical velocity of the wheel until the vertical velocity exceeds a first velocity threshold; initiate a timer when the vertical velocity exceeds the first velocity threshold and repeatedly recalculate the vertical velocity of the wheel until the recalculated vertical velocity exceeds a second velocity threshold; and when the recalculated vertical velocity exceeds the second velocity threshold before the timer exceeds a first time threshold, increase the damping level applied to the wheel and vary at least one of the velocity thresholds and the first time threshold on a basis of a speed of the vehicle.

In accordance with yet another aspect of the present disclosure, a method of controlling a vehicle suspension for a wheel via a controller comprises initiating a timer and maintaining a damping level of an adjustable damping mechanism of the vehicle suspension at an initial value; repeatedly calculating a vertical velocity of the wheel until the vertical velocity exceeds a velocity threshold and the timer does not exceed a time threshold, wherein at least one of the velocity threshold and the time threshold is varied on a basis of a speed of the vehicle; and in response to the vertical velocity exceeding the velocity threshold before the timer exceeds the time threshold, sending an adjustment signal to the adjustable damping mechanism of the vehicle suspension to increase the damping level.

In accordance with a further aspect of the present disclosure, a vehicle suspension system comprises an adjustable damping mechanism operatively coupled to a vehicle wheel, and a controller operatively coupled to the active damping mechanism. The controller is configured to initiate a timer and maintain a damping level of the adjustable damping mechanism at an initial value; repeatedly calculate a vertical velocity of the wheel until the vertical velocity exceeds a velocity threshold and the timer does not exceed a time threshold, wherein at least one of the velocity threshold and the time threshold is varied on a basis of a speed of the vehicle; and send an adjustment signal to the adjustable damping mechanism to increase the damping level in response to the vertical velocity exceeding the velocity threshold before the timer exceeds the time threshold.

In accordance with another aspect of the present disclosure, a method of controlling a vehicle suspension comprises initiating a timer and maintaining a damping level of an adjustable damping mechanism at an initial value when a wheel vertical velocity exceeds a first velocity threshold; and increasing the damping level of the mechanism when the wheel vertical velocity exceeds a second velocity threshold before the timer exceeds a time threshold, wherein at least one of the thresholds is varied on a basis of vehicle speed.

DETAILED DESCRIPTION

Figure 1:
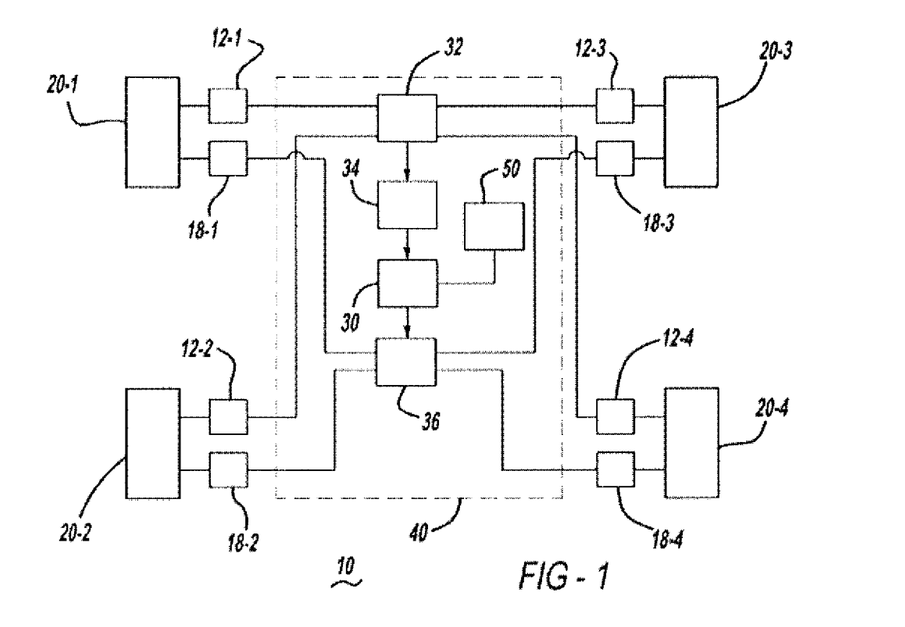
FIG. 1 is a schematic diagram of a portion of an active vehicle suspension system suitable for implementing a damping force control routine in accordance with an embodiment of the present disclosure.

FIG. 1 shows a schematic representation of a portion of one embodiment of an active vehicle suspension system (generally designated 10) configured for controlling damping forces provided by damping mechanisms (for example, shock absorbers) of the vehicle suspension. The active vehicle suspension system includes such active damping mechanisms operatively coupled to associated wheels of the vehicle. These damping mechanisms are configured for controlling a damping force applied to the wheel responsive to control signals generated by a computer processor. The computer may be incorporated into a suspension system controller 40 forming part of an overall vehicle system control system (not shown).

The active suspension system 10 incorporates an embodiment of a damping level control routine as described herein, which is usable for controlling the damping forces responsive to an interaction between a vehicle wheel supported by the damping element and a depression in a road surface on which the wheel is rolling. Spring elements and various other elements of a conventional active vehicle suspension system may also be incorporated in system 10, but are not shown in FIG. 1.

In the embodiment shown in FIG. 1, suspension system 10 includes wheel position sensors 12 (indicated by 12-1, 12-2, 12-3, and 12-4) operatively coupled to a corresponding one of each of vehicle wheels 20-1, 20-2, 20-3, 20-4 and also to controller 40. Sensor(s) 12 are configured for detecting the vertical position of the corresponding vehicle wheel (i.e., the component of the wheel motion along a vertical or "y"-axis 333 extending through the wheel center) and with respect to a reference location in relation to which the wheel is movable. In one embodiment, the reference location is a location on a chassis 22 of the vehicle. In one embodiment, signals representative of wheel position y are continuously received from sensors 12 by a microcomputer 30 for processing in a manner described below.

In the embodiment shown in FIG. 1, suspension system 10 also includes a microcomputer 30 operatively coupled to sensors 12 and configured for processing signals indicating the wheel location in accordance with the control routine to generate control signals used to control the damping levels in the adjustable damping mechanism operatively coupled to each wheel. The computer 30 is configured to determine the vertical velocity of the wheel as the wheel interacts with the road surface. In one embodiment, the vertical velocity of the wheel is determined by taking the time derivative (dy/dt) of the wheel position over a predetermined time period. In another embodiment, the vertical velocity of the wheel is determined by integrating a value provided, for example, by an accelerometer configured to measure the rate of change in velocity of the wheel in a vertical direction. Computer 30 may include a memory for storing the damping level control routine and any additional data or programs that may be required for operation of the suspension system. Computer 30 is incorporated into or operatively coupled to the suspension controller 40.

If desired, one or more known filters 32 (for example, band-pass filters) may be operatively coupled to sensors 12 for filtering noise components from the sensor signals in a known manner. In addition, a pre-processing circuit 34 may be operatively coupled to sensors 12 if needed, for converting signals received from the sensors 12 into a form suitable for processing by computer 30. If required, control signals generated by microcomputer 30 may be transmitted to a driving circuit or post-processor 36 for conversion to a form to which the adjustable damping mechanisms 18 are responsive. The driving circuit may be configured to process the received control signals into a form suitable for operating hydraulically-actuated cylinders, cylinders actuated by solenoid valves or electromagnetically energized proportional-action valves, cylinders incorporating a magneto-rheological fluid, or any other suitable types of active cylinders or shock-absorbers, for example.

A timer element 50 is also incorporated into or operatively coupled to controller 40. Timer 50 is used in the manner described below to measure the lengths of various time periods during which the vertical position of the vehicle wheel is changing as the wheel falls into a depression in the road surface.

If desired, any elements (for example, computer 30, filter 32, etc.) needed to interface between the sensors 12 and the active damping mechanisms may be incorporated into a suspension controller operatively coupled to the damping mechanisms and configured for generating control signals to the damping mechanisms. As previously described, the controller controls adjustment of the damping levels by receiving the sensor signals and generating appropriate control commands to the active damping mechanisms 18.

Figure 2:
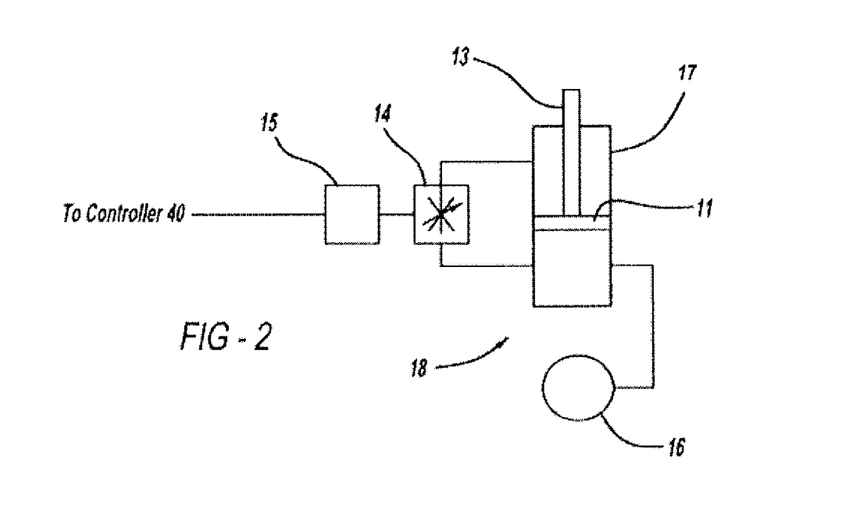
FIG. 2 is a block diagram of an exemplary adjustable damping mechanism controllable in accordance with a damping force control routine in accordance with an embodiment of the present disclosure.

Referring to FIGS. 1 and 2, the suspension system 10 includes an independently operable, active damping mechanism 18 operatively coupled to each vehicle wheel between an unsprung mass and a sprung mass of the vehicle. The damping mechanism 18 coupled to each wheel is operable independently of the damping mechanisms 18 coupled to the other wheels.

FIG. 2 shows one particular structure of an adjustable damping mechanism controllable by controller 40 for implementing embodiments of the damping force control routine described herein. Referring to FIGS. 1 and 2, each of damping mechanisms 18-1, 18-2, 18-3, and 18-4 includes an associated shock absorber which is provided between an unsprung mass and a sprung mass of the vehicle. Each shock absorber includes a hydraulic cylinder 17 subdivided by a piston 11 into an upper and a lower fluid chamber and supported on the unsprung mass of the vehicle. A piston rod 13 of piston 11 is carried by the sprung mass of the vehicle. The upper and lower fluid chambers of the hydraulic cylinder 17 are interconnected through a variable orifice 14. The opening size of the variable orifice 14 is controlled by operation of an associated stepping motor 15 to control the damping force of the shock absorber. In the embodiment shown in FIG. 2, at each of adjustable damping mechanisms 18, the stepping motor 15 is driven to control the size of an associated variable orifice 14 to control the damping force provided by the shock absorbers in adjustable damping mechanisms 18. Thus, in this embodiment, the driving circuit 36 drives each of the stepping motors 15 in response to control signals received from computer 30. The lower fluid chamber of the hydraulic cylinder 17 is connected to an associated gas spring unit 16 which is provided to absorb the volume change in the lower fluid chamber caused by movement of the piston rod 13.

As stated previously, instead of units utilizing stepping motors to control the damping force of the shock absorber, adjustable damping mechanisms 18 in accordance with embodiments of the present disclosure may include hydraulically-actuated cylinders, cylinders actuated by solenoid valves or electromagnetically energized proportional-action valves, cylinders incorporating a magneto-rheological fluid, or any other suitable types of cylinders or shock-absorbers, for example. However, each adjustable damping mechanism 18 may be of any known type controllable by the methods and components described herein to adjust the damping force applied to an associated wheel, and capable of the dynamic response required to provide the variations in damping levels described herein.

Figure 3:
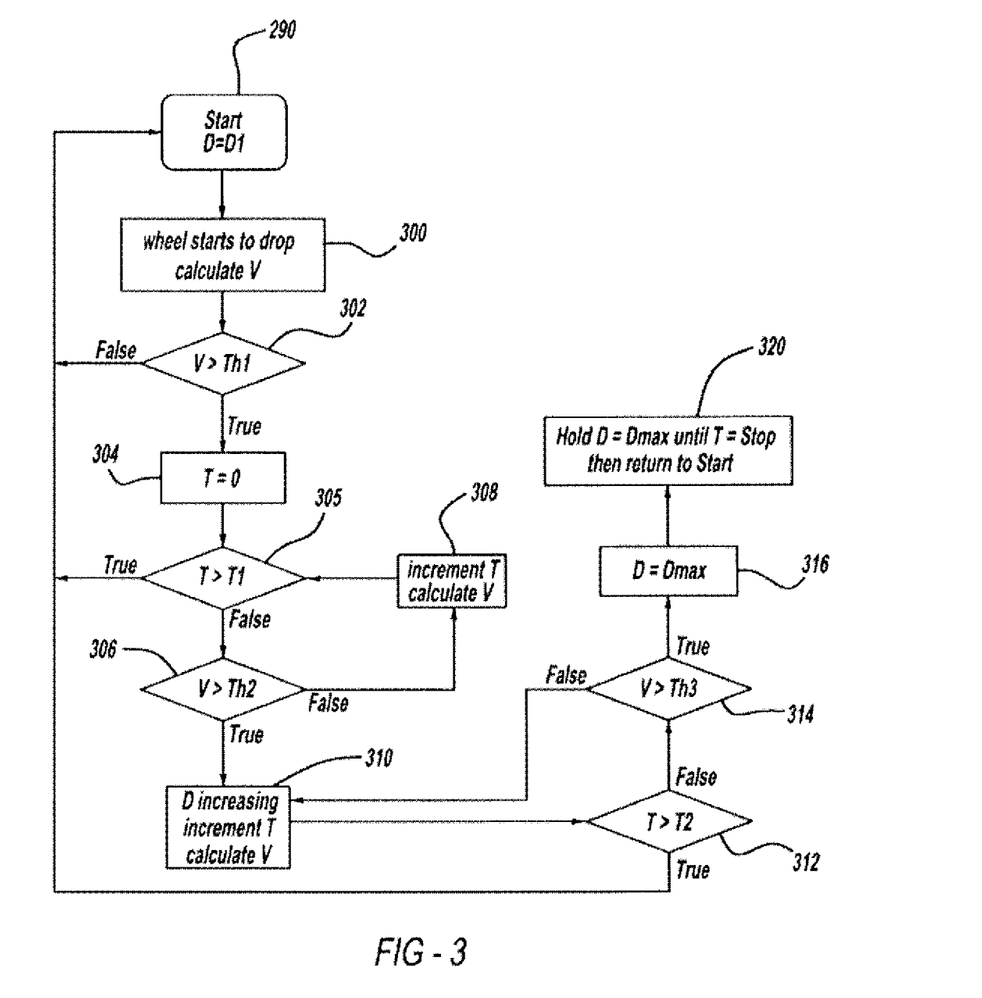
FIG. 3 is a block diagram showing a flow of a damping force control routine for controlling forces in the active damping mechanisms, according to an exemplary embodiment.

In the embodiments of the present disclosure, the computer 30 is designed to repeatedly execute the control routine shown in the flow diagram of FIG. 3. Thus, hereinafter, control of a damping force which attenuates vertical motion of the wheel relative to the vehicle body at the right front road wheel will be described with reference to FIG. 3.

Assuming that the computer 30 has been connected to an electric power source (not shown) by operation of an ignition switch (not shown) of the vehicle, the computer 30 initializes the control program of FIG. 3 and repeats execution of processing steps 290-320 of the program.

FIG. 3 shows one embodiment of a control routine for the portion of the active suspension system controlling the damping level applied to a single wheel 20 of the vehicle. It will be understood that this same control routine may be applied independently to any of the wheels of the vehicle, responsive to the road conditions experienced by the respective wheel.

Figure 4:
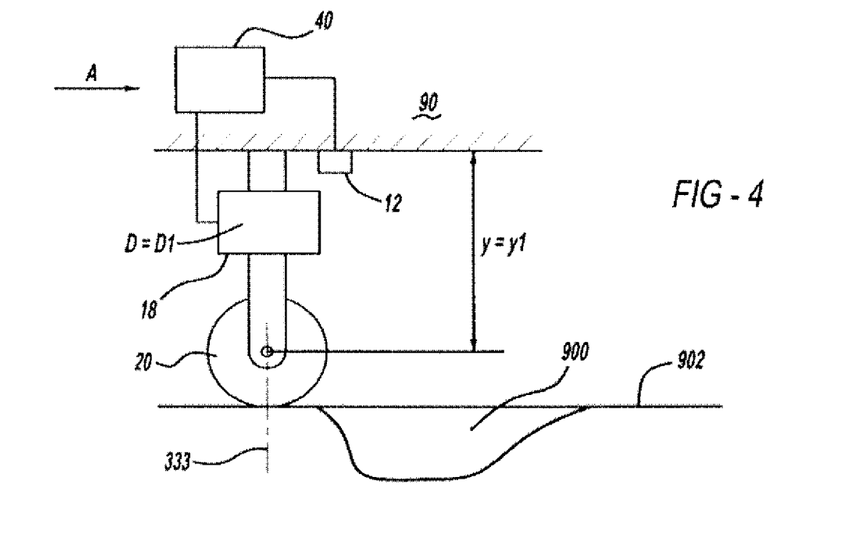
FIG. 4 is a block diagram showing a vehicle wheel moving along a road surface prior to entering a pothole or other depression in the road surface, according to an exemplary embodiment.
Figure 5:
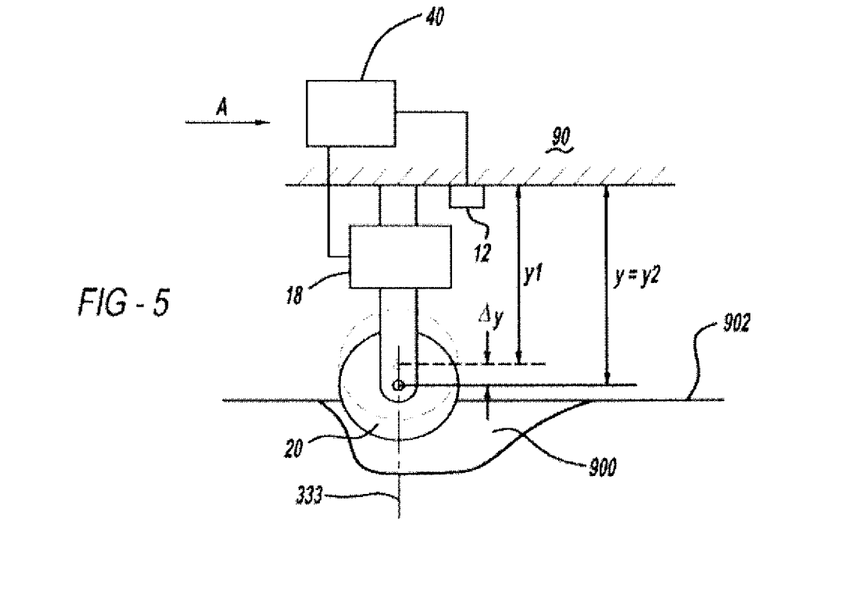
FIG. 5 is a block diagram showing a vehicle wheel moving along a road surface after entering a pothole or other depression in the road surface, according to an exemplary embodiment.

The control routine controls the damping force applied to the wheel responsive to a protocol activated when the time rate of change of the vertical position of the wheel indicates that the wheel may have encountered a pothole or other depression in the road surface. In FIGS. 4 and 5, the parameter "y" represents a current position of the wheel 20 along a vertical axis with respect to a predetermined reference location (for example, a location on the chassis 90) with respect to which the wheel is movable vertically, and parameter D represents a damping force level applied to the wheel. Arrow "A" represents the direction of vehicle travel along road surface 902.

In block 290 of the control routine, parameters y and D are at initial levels representing a state of an associated damping element 18 prior to the wheel 20 encountering a chuck hole or pothole 900. FIG. 4 also shows the wheel 20 moving along the road surface 902 prior to entering the pothole 900. Initially, the wheel 20 is traveling along a relatively smooth portion of the road 902, and the elements of the suspension system are adjusted so as to provide a damping level D having an initial (i.e., "normal") reference value of D1. The initial value of D1 may be any desired value within the controllable range of settings for the damping level D, depending on the specific characteristics and elements of the particular suspension system. In the embodiments of the present disclosure described herein, the initial damping level D1 is set to provide a relatively low degree of damping to the wheel motion, thereby providing a relatively "softer" suspension for enhanced ride quality. In addition, the vertical position y1 of the wheel with respect to the reference location while the wheel is travelling along the smooth road surface is assigned a "0" (zero) value.

At block 300 of FIG. 3 and as shown in FIG. 5, the wheel 20 has encountered a relative depression 900 in the road 902 which may or may not be a pothole. As a result of the depression 900, road support is removed from the wheel 20 and the wheel begins to drop into the depression. Position sensor 12 operatively coupled to the wheel continuously senses the vertical wheel position "y" as the wheel drops into the depression and conveys this position to computer 30.

In the manner previously described, after passage of a predetermined time interval $\Delta t$, the new, lower position of the wheel is assigned to the variable y2 by the computer. The computer 30 then calculates the absolute value of the time rate of change in position $\Delta y_1 = y2 - y1$ of the wheel over the predetermined time interval $\Delta t$ (i.e., the computer calculates the time derivative of position coordinate y, which is (dy/dt). This calculated time rate of change in wheel position is assigned to the variable V, and represents the instantaneous velocity of the wheel in the vertical direction at time $\Delta t$ and in wheel position y2. For purposes of adjusting the damping forces applied to the wheel, the contemplated range of values of $\Delta t$ includes values less than 10 milliseconds. In one particular embodiment, the value of $\Delta t$ is 2 milliseconds. The range of values of $\Delta t$ depends on type of suspension design and components used and other pertinent factors. However, the value of $\Delta t$ may be set at any desired value, depending on the requirements of a particular application. As stated previously, the predetermined value of $\Delta t$ may be stored, for example, in a look-up table in computer memory. In general, for purposes of adjusting the damping forces applied to the wheel, it is desirable that the time interval $\Delta t$ be as short as possible so that a rapid determination can be made regarding whether the threshold value Th1 has been exceeded and further, rapid successive measurements of the wheel position y are required.

In block 302, the calculated value of the instantaneous velocity V is compared to a first predetermined velocity threshold value Th1. If V is less than Th1, a "false" condition is recognized and the process returns to block 290 (i.e., the damping level D is maintained at the initial reference value of D1). This damping level is maintained until the wheel encounters a depression in the road. However, if V is equal to or exceeds Th1, a "true" condition is recognized. The fact that the instantaneous velocity V met or exceeded the threshold value Th1 is taken as an indication that the wheel is potentially beginning to fall into a depression 900. The satisfaction of this condition is interpreted as confirmation that the wheel has encountered a potential pothole condition and, following this confirmation, the "y" position of the wheel is measured at very short intervals of time to monitor the continued drop (if any) of the wheel into the depression. The occurrence of a "true" condition indicates that the change in wheel position ($\Delta y$) over the elapsed time $\Delta t$ (i.e., the speed of the vertical component of motion of the wheel into the depression) as just measured is sufficient to warrant initialization and activation of timer 50 to measure the time elapsed during any further changes in wheel position. In this case, the process goes to block 304.

The predetermined velocity threshold values used by the control routine as described herein may be stored, for example, in a look-up table in computer memory. The predetermined velocity threshold values may be calculated and/or iteratively determined by experimentation for each configuration of a wheel and an associated active suspension system, and then saved in the computer memory. The predetermined velocity threshold values are selected with a view to minimizing the deleterious effects on ride and maximizing the probability of detecting an actual pothole event as soon as possible upon its occurrence. Values typically range between 0.2 meters/second and 5 meters/second. Factors affecting the range of values include suspension tuning, vehicle speed, vehicle tire characteristics, and other factors. The ranges of values for the various velocity thresholds may be based on data collected from both potholes and non-pothole ride events. The use of such data to program or "tune" the suspension system facilitates rapid detection of actual potholes, while helping to minimize negative effects on ride due to increases in damping prompted by "false positive" detections of pothole events.

At block 304, once it has been determined that the wheel may have encountered a pothole event, the timer is set to an initial value of T=0, and then allowed to increment.

The loop or subroutine formed by blocks 305, 306 and 308 is directed to comparing the instantaneous velocity V of the wheel at successive points in time to another predetermined threshold velocity value Th2 until either (1) the timer value T exceeds a predetermined first time threshold T1, or (2) the instantaneous velocity V of the wheel exceeds the predetermined velocity threshold value Th2. As before, the instantaneous velocities V at the successive points in time are calculated by taking the time derivative of the vertical position y of the wheel (dy/dt) where dt is the time elapsed between any two the successive points in time at which the wheel location y is measured and dy is the additional vertical distance the wheel has fallen during the time dt. In the embodiments described herein, the range of values for T1 is 0.001 to 0.100 milliseconds. Generally, the time threshold T1 is longer than the value of Δt. The length of T1 should be sufficient to enable differentiation of an actual pothole event from sensor noise, based on passage of the velocity threshold within the time threshold T1. The ranges of values for the time threshold T1 may be based on data collected from both potholes and non-pothole ride events. The use of such data to program or "tune" the suspension system facilitates rapid detection of actual potholes, while helping to minimize negative effects on ride due to increases in damping prompted by "false positive" detections of pothole events.

At block 305, the timer reading T since initialization is compared with the first predetermined time threshold T1. If the timer reading T is greater than the value of T1 (i.e., if the time elapsed since the re-initialization of the timer is greater than T1), a "true" condition is recognized and the damping level D is maintained at the reference value D1. If the time elapsed since the re-initialization of the timer is less than T1, a "false" condition is recognized and the process proceeds to block 306, where the instantaneous velocity V=Δy/T (i.e., dy/dt) of the wheel is again calculated.

In block 306, the new calculated value of the instantaneous wheel velocity V is compared to a second predetermined threshold value Th2. If the new wheel velocity V exceeds Th2, a "true" condition is recognized and it is determined that the change in wheel position (Δy) over the elapsed time T (i.e., the new instantaneous velocity of the wheel into the depression) is sufficient to warrant an increase in damping level D. Thus, the process proceeds to block 310. However, if the instantaneous wheel velocity V is equal to or less than Th2, a "false" condition is recognized and the process proceeds to block 308 where the instantaneous wheel velocity V is re-calculated after passage of an additional predetermined time interval Δt (i.e., after T has been incremented by Δt). The process then proceeds back to block 305 to determine if the total time T elapsed since initialization of the timer is greater than time threshold T1. If T is greater than T1, the control routing proceeds back to block 290.

In the manner described above, the loop 305-306-308 repeats as long as the timer value T does not exceed the threshold T1, and as long as the instantaneous wheel velocity V does not exceed the velocity threshold Th2. If the timer value T exceeds the first timer threshold T1 without the wheel velocity V exceeding the velocity threshold VTh2, a "false" condition is recognized and it is determined that the wheel has not moved or has not moved with sufficient velocity during passage of the time period T1 to warrant an increase in the damping level D. The damping level is thus returned to the initial reference value D1. However, if the wheel velocity V in block 306 exceeds the velocity threshold Th2 before the timer value T exceeds first timer threshold T1, a "true" condition is recognized and the process proceeds to block 310, where the damping level D is increased by a predetermined amount ΔD to a higher value of D2. Stated another way, after the passage of every time interval Δt, the instantaneous wheel velocity V is re-calculated and both the timer reading T and the instantaneous wheel velocity V are compared to respective threshold values to determine whether the damping level D is to be modified. Incremental increases in the damping level are implemented as a "ramp" or "slope" extending between the initial and new damping levels. If the instantaneous wheel velocity V exceeds threshold Th2 within the time period defined by T1, a "true" condition is recognized and the damping level is increased in block 310. However, if the instantaneous wheel velocity V remains equal to or below the first threshold Th2 within the time period defined by T1, the damping level D is thus returned to the initial reference value D1.

The loop formed by blocks 310, 312 and 314 is directed to incrementally increasing the damping level by a predetermined amount after the passage of every time interval Δt until either (1) the timer reading T after initialization exceeds a second timer threshold T2, or (2) the instantaneous wheel velocity V exceeds a third velocity threshold Th3.

Instances where the wheel continues to exceed the velocity thresholds within the associated time intervals indicate a lack of road support for the wheel to a depth sufficient to cause the wheel to continue to drop in the "y" direction.

The amounts by which the damping level D is incremented during execution of the control routine described herein may be constant for each step, or the amounts may be determined according to the requirements of a particular application. The amounts by which the damping level D is incremented may be determined according to the requirements of a particular suspension system design, the range of damping settings available in a particular type of damping, the method used to actuate the damping, and other pertinent factors. In addition, the number of steps or increments into which the range of damping levels may be divided to facilitate the incremental increases in damping levels may be determined according to the requirements of a particular application.

In block 310, the damping level is increased by a predetermined amount ΔD to level D2. The instantaneous wheel velocity V is re-calculated after the passage of another time interval Δt (i.e., after timer value T has been incremented another Δt from its value as used in the previous instantaneous velocity calculation).

In block 312, the timer reading T is compared with a second predetermined time threshold T2. If the timer reading T is greater than the value of T2 (i.e., if the time elapsed since the initialization of the timer in block 304 is greater than T2), a "true" condition is recognized and the damping level D is returned to the reference value D1. However, if the time elapsed since the initialization of the timer is less than T2, a "false" condition is recognized and the process proceeds to block 314.

In block 314, if the instantaneous wheel velocity V is equal to or less than threshold Th3, a "false" condition is recognized and the process proceeds back to block 310 where the damping level is again increased by a predetermined amount ΔD and the instantaneous wheel velocity V is re-calculated after passage of an additional predetermined time interval Δt. The process then proceeds back to block 312 to determine if the elapsed time T is greater than time threshold T2.

In the manner described above, the loop 310-312-314 repeats as long as the timer value T does not exceed the second timer threshold T2, and as long as the instantaneous wheel velocity V does not exceed the third velocity threshold Th3. If the timer value T (measured since initialization) exceeds the second timer threshold T2 without the wheel velocity V exceeding the velocity threshold Th3, a "false" condition is recognized and it is determined that the wheel has not moved further or has not moved with sufficient velocity during passage of the time period T2 to warrant a further increase in the damping level. The damping level is thus returned to the initial reference value D1.

However, if the wheel velocity V exceeds threshold Th3 prior to the timer value T exceeding the second timer threshold T2, a "true" condition is recognized and it is determined that the change in wheel position (Δy) over the elapsed time T (i.e., the speed of the vertical motion of the wheel into the depression) is sufficient to warrant a further increase in damping level D to the maximum tuned damping level, $D_{MAX}$ in block 316.

While the process proceeds through the loop defined by blocks 310-312-314, the damping level continues to be incremented gradually, in stepwise manner so that, if and when the maximum damping level $D_{MAX}$ is required, the increase in damping level from the current damping level to $D_{MAX}$ will be smaller than the increase in damping level from D1 to $D_{MAX}$. This aids in minimizing or eliminating the "knocking" or "thumping" effect which may be caused by a sudden, large shift in hydraulic pressure needed to progress from D1 to $D_{MAX}$ in a relatively shorter time period, and which may be discernible by passengers of the vehicle. The process described herein also enables the system damping force to be increased incrementally between a first predetermined value to a next, higher predetermined value. Thus, when it is determined that the next, higher predetermined value is required, the size of the remaining increase required to reach the next, higher predetermined value is smaller than the size of the gap between the first predetermined value and the highest predetermined value.

In block 320, the damping level is maintained at $D=D_{MAX}$ until the elapsed time as indicated by the timer value T reaches a predetermined stop point $T_{STOP}$. The damping level is then returned to the initial reference value D1.

By incrementally increasing the damping forces exerted by the damping responsive to the continued drop of the wheel into the road depression, the embodiments of the control routine described herein helps to minimize the amount of the damping force increase and delays implementation of the force increase for as long as possible, thereby preserving the relatively higher ride quality provided by the lower damping level for as long as possible. To accomplish such an incremental increase in damping force, a controller for a suspension system may use a plurality of wheel velocity thresholds, thus minimizing or avoiding a sudden, large shift in hydraulic pressure when progressing from an initial damping level (e.g., damping level D1) to a maximum damping level (e.g., maximum damping level $D_{MAX}$). As described above with regard to the exemplary embodiment of FIG. 3, three thresholds, Th1, Th2, and Th3, may be compared with an instantaneous wheel velocity V. Various numbers of wheel velocity thresholds are contemplated by the present disclosure for comparison to an instantaneous wheel velocity, such as, for example, one, two, three, four, five, six, seven, eight, nine, ten, or more thresholds.

Figure 6:
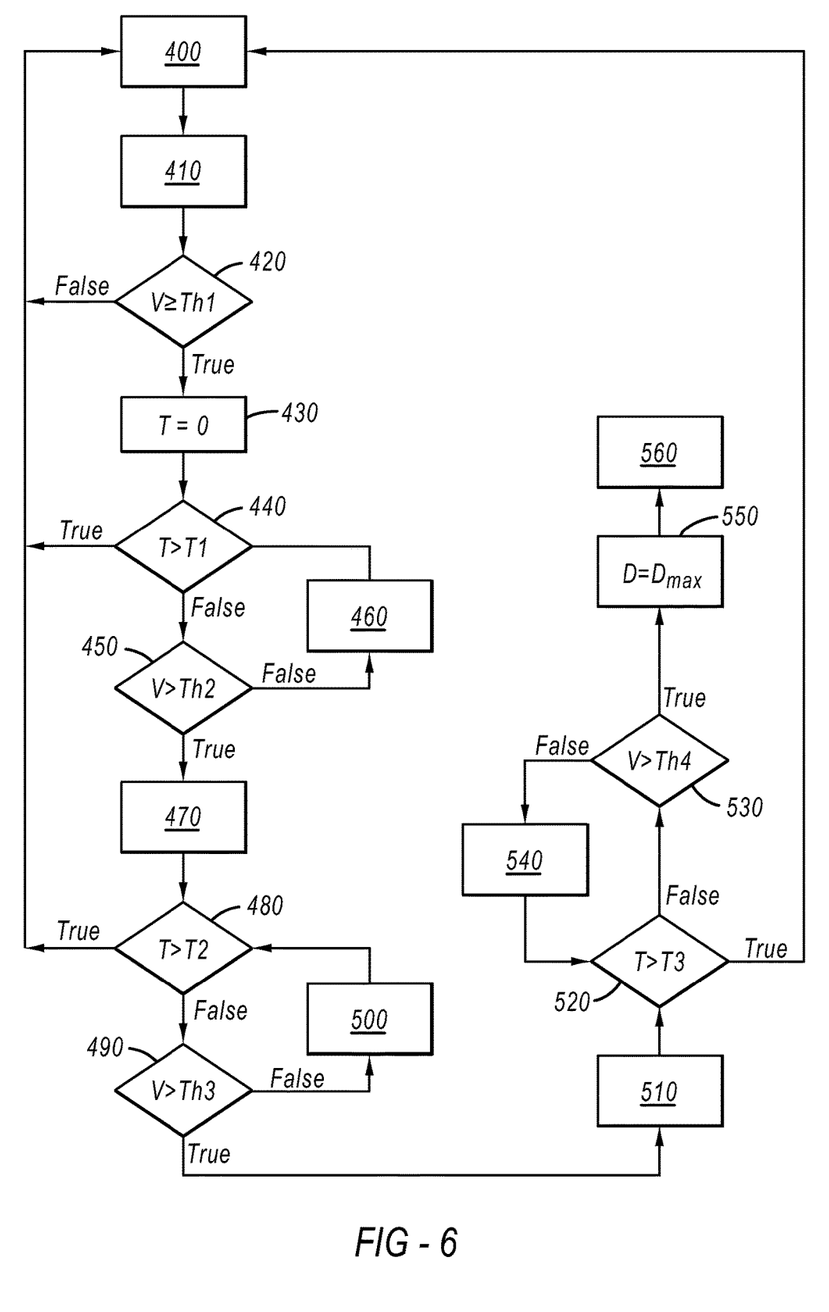
FIG. 6 is a block diagram showing a flow of a damping force control routine for controlling forces in active damping mechanisms, according to an exemplary embodiment.

Turning to FIG. 6, a damping force control process that uses four thresholds is schematically depicted. A portion of the process depicted in FIG. 6 uses steps similar to those of the process discussed above with regard to the exemplary embodiment of FIG. 3. The process may begin at block 400, in which elements of a vehicle suspension system have an initial damping level D of D1, as discussed above with regard to block 290 of FIG. 3. At block 410, a vehicle wheel encounters a depression (e.g., depression 900 in FIGS. 4 and 5), causing the wheel to drop into the depression and a sensor (e.g., sensor 12 in FIGS. 4 and 5) to detect the vertical position of the wheel as it drops into the depression, which is used to calculate an instantaneous wheel velocity V, as discussed above with regard to block 300 of FIG. 3.

The instantaneous wheel velocity V is compared to a first predetermined velocity threshold value Th1, as discussed above with regard to block 302 of FIG. 3. If the wheel velocity V is less than Th1, a "false" condition is recognized and the process returns to block 400. If the wheel velocity is equal to or exceeds Th1, a "true" condition is recognized and the process advances to block 430, in which the controller sets a timer to an initial value of T=0. Subsequently, the controller determines whether the timer value T exceeds a predetermined first time threshold T1 in block 440. If so, a "true" condition is recognized and the process returns to block 400, causing the damping level to be maintained at the initial value D1. If the timer value T does not exceed the first predetermined time threshold T1, a "false" condition is recognized and the process advances to block 450, in which the instantaneous wheel velocity V is compared to a second predetermined threshold value Th2. If the instantaneous wheel velocity V equals or does not exceed the second predetermined velocity threshold value Th2, a "false" condition is recognized and the process advances to block 460, in which the timer value T is incremented and the instantaneous wheel velocity V is re-calculated after a passage of a time interval, as discussed above with regard to block 308 in FIG. 3, before returning to block 440. If the instantaneous wheel velocity V exceeds the second predetermined threshold value Th2, a "true" condition is recognized and the process advances.

In block 470, the damping level D is increased, such as by a predetermined amount, the timer value T is incremented, and the instantaneous wheel velocity V is re-calculated, as discussed above with regard to block 310 in FIG. 3. The process then advances to block 480, in which the controller determines whether the timer value T exceeds a second predetermined time threshold T2. If so, a "true" condition is recognized and the process returns to block 400, at which the damping level D is returned to the initial value D1. If the timer value T does not exceed the second predetermined time threshold T2, the process advances to block 490, in which the controller determines whether the instantaneous wheel velocity V exceeds a third predetermined velocity threshold value Th3. If not, a "false" condition is recognized and the process advances to block 500, in which the timer value T is incremented and the instantaneous wheel velocity V is re-calculated, before returning to block 480. When the instantaneous wheel velocity V exceeds the third predetermined threshold value Th3, the process advances to block 510, in which the damping level D is increased, such as by a predetermined amount, the timer value T is incremented, and the instantaneous wheel velocity V is re-calculated, similar to the process discussed above with regard to block 310 in FIG. 3.

The loop represented by blocks 520, 530, 540 represents the use of additional thresholds, such as a third predetermined time threshold T3 and a fourth predetermined velocity threshold value Th4. For example, the timer value T is compared to the third predetermined time threshold T3 in block 520. If the timer value T exceeds the third predetermined time threshold T3, a "true" condition is recognized and the process returns to block 400, at which the damping level D is returned to the initial value D1. If the timer value T does not exceed the third predetermined time threshold T3, the process advances to block 530, in which the instantaneous wheel velocity V is compared to the fourth predetermined velocity threshold value Th4. If the instantaneous wheel velocity V does not exceed the fourth predetermined velocity threshold value Th4, the process advances to block 540, in which the timer value T is incremented and the instantaneous wheel velocity V is recalculated. If the instantaneous wheel velocity V exceeds the fourth predetermined velocity threshold value Th4, the process advances to block 550, in which the damping level D is set to a maximum damping level $D_{MAX}$, as discussed above with regard to block 316 in FIG. 3, and the process advances to block 560, in which the damping level D is maintained at the maximum damping level $D_{MAX}$ until the timer value T reaches a predetermined time, as discussed above with regard to block 320 in FIG. 3.

By using a plurality of thresholds, such as the timer thresholds and/or wheel velocity thresholds in the process of the exemplary embodiment of FIG. 6, damping forces can be incrementally increased in response to the continued drop of the wheel, which minimizes damping force increases, while delaying implementation of a damping force increase for as long as possible, thereby preserving a relatively higher ride quality for as long as possible, while minimizing or avoiding a sudden, large shift in hydraulic pressure for a damping system.

Although the exemplary process of FIG. 6 has been discussed with regard to using four wheel velocity thresholds, Th1, Th2, Th3, and Th4, the processes of the various exemplary embodiments described herein may use other numbers of wheel velocity thresholds, as discussed above, to incrementally increase damping force and minimize or prevent sudden, large shifts in damping force. For example, the loop represented by steps 520, 530, 540 in FIG. 6 may be duplicated one or more times between steps 530 and 550, with each duplicate loop using a different wheel speed threshold and timer threshold.

The present disclosure further contemplates using a confidence level when determining whether a vehicle wheel has encountered a depression in a ground surface. The various exemplary embodiments herein contemplate the controller (e.g., controller 40) calculating a confidence level based on more than a wheel velocity threshold. For example, a controller may calculate a confidence level based upon whether a calculated wheel velocity attains one or more wheel velocity thresholds, whether the calculated wheel velocity attains the wheel velocity thresholds within a predetermined time (e.g., according to the timer thresholds), and according to a vertical displacement (e.g., vertical position y1 of a wheel in FIG. 5) of a wheel.

Vehicle speed may affect the impact force a wheel of a vehicle experiences when the wheel encounters a depression in a road surface. For instance, higher vehicle speeds may lead to reduced impact forces for a vehicle wheel when the wheel encounters a depression. This may occur because there is less time for the wheel to drop into the depression as the vehicle is moving forward at the high speed. As a result, there may be a lesser need for damping at higher vehicle speeds because of the reduced amount of impact forces experienced at the higher vehicle speeds.

In view of this consideration, the present disclosure contemplates varying thresholds according to vehicle speed. According to an exemplary embodiment, as vehicle speed increases, time thresholds may be varied. For example, time thresholds (e.g., time thresholds T1, T2, T3 in FIGS. 3 and 4) may be varied with vehicle speed. For example, controller 40 may be configured to decrease the values for time thresholds as vehicle speed increases so that there is less time for a calculated wheel velocity to exceed a wheel speed threshold, resulting in less damping at higher vehicle speeds in view of the reduced effects of depressions upon a vehicle at higher speeds. Conversely, as vehicle speed decreases, controller 40 may be configured to increase the values for time thresholds so that there is more time allotted for a calculated vehicle velocity to exceed a wheel speed threshold, thus facilitating increases in damping at lower vehicle speeds. According to an exemplary embodiment, a time threshold may increase or decrease about 0.001 seconds to about 0.05 seconds for vehicle speeds ranging from about 10-80 mph.

In addition, or as an alternative, to increasing time thresholds, wheel velocity thresholds (e.g., thresholds Th1, Th2, Th3, Th4 in FIGS. 3 and 4) may be varied with vehicle speed. For example, controller 40 may be configured to increase the values of wheel velocity thresholds as vehicle speed increases. Due to the increased values of wheel velocity thresholds, incremental increases in damping level do not occur unless a calculated wheel velocity is great enough to exceed the increased values for the wheel velocity thresholds, thus leading to less damping at higher vehicle speeds. Conversely, as vehicle velocity decreases, controller 40 may be configured to decrease the values for the wheel velocity thresholds so that lesser values for a calculated wheel velocity is required to exceed the wheel velocity thresholds, which facilitates increases in damping level at lower vehicle speeds. According to an exemplary embodiment, a wheel velocity threshold may increase or decrease about 0.3 m/s to about 2 m/s for vehicle speeds ranging from about 10-80 mph.

The present disclosure contemplates controlling a damping level for one or more rear wheels of a vehicle based upon conditions of one or more front wheels of the vehicle. According to an exemplary embodiment, a rear wheel of a vehicle may be controlled on a basis of how a corresponding front wheel (e.g., a front wheel in front of the rear wheel, such as, for example, a left front wheel in front of a left rear wheel) is controlled. For instance, when a controller determines that a front wheel has entered a depression in a road surface, as discussed above with regard to the exemplary embodiments of FIGS. 4-6, the controller may control a damping level for a rear wheel behind the front wheel.

Although there is little time for the controller and suspension system to react to a front wheel entering a depression and to adjust a damping rate for the front wheel accordingly, the controller may use information obtained for the front wheel to control a damping level for a rear wheel prior to, or at the moment, a rear wheel encounters the depression. Thus, a damping level for the rear wheel may be prepared, such as by increasing the damping level for the rear wheel to minimize a load transmitted to the suspension system when the rear wheel encounters the depression. For instance, when a front wheel encounters a depression in a road surface, the front wheel may experience an acceleration of about 80G (i.e., eighty times the force of earth's gravity) if no control of the damping level for the front wheel is performed, or about 60G if the damping level is controlled in the brief amount of time the suspension system and controller have to react to the front wheel encountering the depression. However, because a rear wheel is located a distance behind the front wheel at the time the front wheel encounters the depression, the system can prepare for the event before the rear wheel encounters it. Thus, the rear wheel may experience an acceleration of about 20G to about 30G due to the control of the damping level for the rear wheel based on information obtained when controlling the front wheel.

Figure 7:
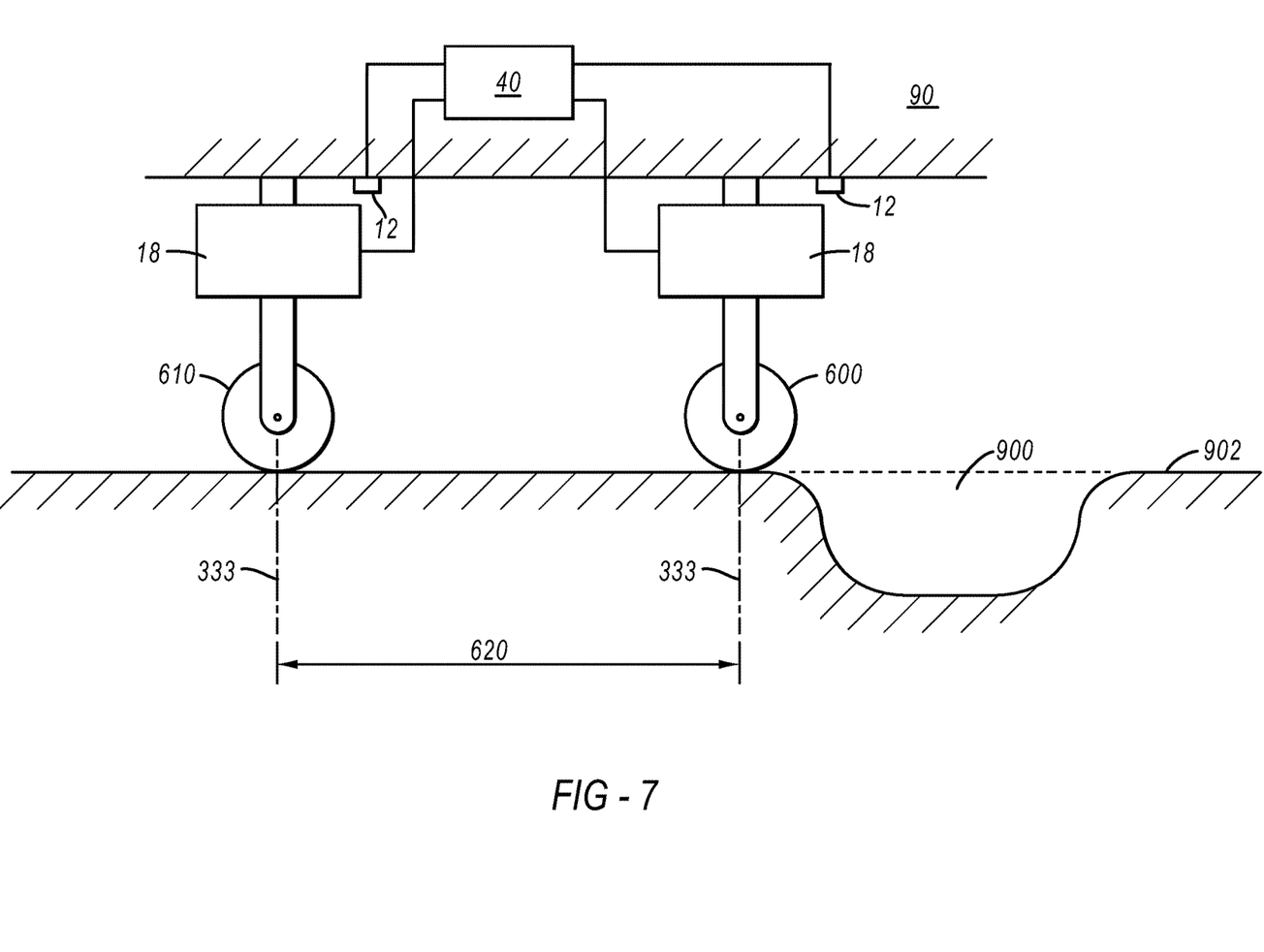
FIG. 7 schematically depicts a front wheel and a rear wheel of a vehicle moving along a road surface that includes a depression, according to an exemplary embodiment.

Turning to FIG. 7, a side schematic view is shown of a front wheel 600 and a rear wheel 610 of a vehicle traveling along a road surface 902. Each of the front wheel 600 and rear wheel 610 is coupled to an adjustable damping mechanism 18 coupled to the vehicle chassis 90 and has a respective sensor 12 configured to detect the vertical position of a respective wheel 600 or 610, as discussed above with regard to the exemplary embodiment of FIGS. 4 and 5. Controller 40 is in signal communication with sensors 12 and the adjustable damping mechanisms 18 so controller 40 may receive signals from sensors 12 and control the adjustable damping mechanisms 18, as discussed in the exemplary embodiments above.

According to an exemplary embodiment, a damping level for the damping mechanism 18 of rear wheel 610 may be controlled on a basis of information obtained for front wheel 600 when front wheel 600 encounters a depression 900 in a road surface 902. For example, as the front wheel 600 drops into the depression and its adjustable damping mechanism 18 is controlled, such as according to the exemplary embodiments of FIGS. 3 and 6, the adjustable damping mechanism 18 for the rear wheel 610 may be controlled by using the damping level selected for the adjustable damping mechanism 18 of the front wheel 600. For instance, as the calculated instantaneous wheel velocity V for the front wheel 600 exceeds predetermined wheel velocity thresholds (e.g., thresholds Th1, Th2, Th3, Th4), such as within a predetermined time (e.g., within time thresholds T1, T2, T3), the damping level for the adjustable damping mechanism 18 of front wheel 600 is incremented, as discussed above with regard to the exemplary embodiments of FIGS. 3 and 6.

According to an exemplary embodiment, the adjustable damping mechanism 18 of rear wheel 610 may be controlled to use the same damping level as the front wheel 600. For example, the damping level for the adjustable damping mechanism 18 of rear wheel 610 may be controlled for when the rear wheel 610 is estimated to encounter the depression 900, or prior to the rear wheel 610 encountering the depression 900. For example, the distance 620 between front wheel 600 and rear wheel 610, such as between vertical axes 333 of the wheels, and a current vehicle speed (e.g., determined from one or more vehicle sensors that indicate vehicle speed, such as, for example, wheel speed sensors, engine shaft speed sensors, and other sensors familiar to one of ordinary skill in the art for determining vehicle speed) may be used to determine a time at which rear wheel 610 encounters the depression. The distance 620 may correspond to, for example, a wheel base of the vehicle. According to an exemplary embodiment, the damping level for the adjustable damping mechanism 18 of the rear wheel 610 is controlled in advance of the rear wheel 610 encountering the depression 900, such as by using a portion of the distance 620 between the wheels 600, 610. The portion of the distance 620 may be, for example, about 60% to about 80% of the distance 620, such as about 70% of the distance 620.

Using the embodiments of the control routine described herein, implementation of the damping force increase to $D_{MAX}$ (which has the greatest deleterious effect on ride quality) is ideally restricted to cases where it is most desired (i.e., cases where the wheel encounters a relatively deep pothole or depression). This increase in damping level limits the depth to which the wheel drops into the depression and aids in minimizing the jarring impact caused by the wheel striking the opposite side of the pothole as it rises out of the hole.

A control routine in accordance with an embodiment of the present disclosure may be incorporated as a subroutine into a broader new or existing control routine designed to control to additional elements of the suspension system as well as the active damping mechanism, and/or which controls elements of the active suspension system based on inputs from both the wheel position sensors and other types of sensors.

As described above, a control routine in accordance with an embodiment of the present disclosure enables efficient operation of vehicle suspension systems incorporating continuously variable or multistep suspension dampers, so as to maximize ride quality and reduce loading on the suspension system.

As described herein, one embodiment of the present disclosure includes an active vehicle suspension system having an active damping mechanism operatively coupled to a vehicle wheel and configured for controlling a damping force applied to the wheel responsive to a control signal. A controller is operatively coupled to the damping mechanism and configured for generating a control signal to the damping mechanism responsive to a velocity of the wheel in a downward vertical direction.

Also as described herein, another embodiment of the present disclosure provides a method for controlling a damping level applied to a wheel in an active suspension system. The method includes the steps of determining a velocity defined as a rate of change of a vertical position of the wheel over a first predetermined time period; comparing the velocity to a velocity threshold; and where the velocity is greater than the velocity-threshold, increasing the damping level.

Also as described herein, another embodiment of the present disclosure provides a method for applying a damping force to a wheel moving in a downward vertical direction. The method includes the steps of measuring a time during which the wheel moves in the direction; measuring a velocity of the wheel in the direction; comparing the time to a threshold and the velocity to another threshold; and where the time does not exceed the threshold and the velocity exceeds the other threshold, applying a maximum available damping force to the wheel.

It will be understood that the foregoing descriptions of embodiments of the present disclosure are for illustrative purposes only. As such, the various structural and operational features herein disclosed are susceptible to a number of modifications commensurate with the abilities of one of ordinary skill in the art, none of which departs from the scope of the present disclosure as defined in the appended claims.

What is claimed is:

1. A method of controlling a vehicle suspension for a wheel via a controller, the method comprising:
repeatedly calculating a vertical velocity of the wheel until the vertical velocity exceeds a first velocity threshold;
in response to the vertical velocity exceeding the first velocity threshold, initiating a timer while repeatedly recalculating the vertical velocity of the wheel until the recalculated vertical velocity exceeds a second velocity threshold; and
in response to the recalculated vertical velocity exceeding the second velocity threshold before the timer exceeds a first time threshold, increasing a damping level of the suspension;
wherein at least one of the velocity thresholds and the first time threshold is varied on a basis of a speed of the vehicle.

2. The method of claim 1, wherein the first time threshold is varied on the basis of the speed of the vehicle by decreasing the first time threshold as the speed of the vehicle increases.

3. The method of claim 1, wherein the velocity thresholds are varied on the basis of the speed of the vehicle by increasing the velocity thresholds as the speed of the vehicle increases.

4. The method of claim 1, wherein increasing the damping level comprises:
recalculating the vertical velocity with each increase of the damping level or increase of the timer; and
determining whether the recalculated vertical velocity exceeds a third velocity threshold or the timer exceeds a second time threshold.

5. The method of claim 4, further comprising, in response to the recalculated vertical velocity being less than the third velocity threshold and the timer exceeding the second time threshold, adjusting an adjustable damping mechanism to revert to an initial value of damping.

6. The method of claim 4, wherein the second time threshold is greater than the first time threshold.

7. The method of claim 4, further comprising, upon the recalculated vertical velocity exceeding the third velocity threshold and the timer not exceeding the second time threshold:
recalculating the vertical velocity with each increase of the timer; and
determining whether the recalculated vertical velocity exceeds a fourth velocity threshold or the timer exceeds a third time threshold.

8. The method of claim 7, further comprising, in response to the recalculated vertical velocity being less than the fourth velocity threshold and the timer exceeding the third time threshold, adjusting an adjustable damping mechanism to revert to an initial value of damping.

9. The method of claim 1, wherein increasing a damping level of the suspension includes sending an adjustment signal to an adjustable damping mechanism of a front wheel of the vehicle and sending an adjustment signal to an adjustable damping mechanism of a rear wheel of the vehicle based on the adjustment signal sent to the adjustable damping mechanism of the front wheel.

10. The method of claim 9, wherein the sending the adjustment signal to the adjustable damping mechanism of the rear wheel is timed based on a distance between the front wheel and the rear wheel.

11. The method of claim 1, wherein an adjustable damping mechanism comprises a variable orifice, and wherein increasing a damping level of the suspension comprises sending an adjustment signal signaling a change in a size of the variable orifice to provide a corresponding change in damping level for the vehicle suspension.

12. A vehicle suspension system, comprising:
an active damping mechanism operatively coupled to a vehicle wheel; and
a controller operatively coupled to the active damping mechanism, the controller being configured to:
repeatedly calculate a vertical velocity of the wheel until the vertical velocity exceeds a first velocity threshold;
initiate a timer when the vertical velocity exceeds the first velocity threshold and repeatedly recalculate the vertical velocity of the wheel until the recalculated vertical velocity exceeds a second velocity threshold;
when the recalculated vertical velocity exceeds the second velocity threshold before the timer exceeds a first time threshold, increase a damping level applied to the wheel; and
vary at least one of the velocity thresholds and the first time threshold on a basis of a speed of the vehicle.

13. The system of claim 12, wherein the controller is configured to vary the first time threshold on the basis of the speed of the vehicle by decreasing the first time threshold as the speed of the vehicle increases.

14. The system of claim 12, wherein the controller is configured to vary the velocity thresholds on the basis of the speed of the vehicle by increasing the velocity thresholds as the speed of the vehicle increases.

15. The system of claim 12, wherein the controller is configured to:
recalculate the vertical velocity with each increase of the timer; and
adjust the active damping mechanism to increase the damping by an incremental amount when the recalculated vertical velocity exceeds a third velocity threshold and the timer does not exceed a second time threshold.

16. The system of claim 15, wherein the controller is configured to:
recalculate the vertical velocity with each increase of the timer; and
adjust the active damping mechanism to increase the damping when the recalculated vertical velocity exceeds a fourth velocity threshold and the timer does not exceed a third time threshold.

17. The system of claim 15, wherein the controller is further configured to, in response to the recalculated vertical velocity being less than the third velocity threshold and the timer exceeding the second time threshold, adjust the active damping mechanism to revert to an initial value of damping.

18. The system of claim 12, further comprising one or more sensors that measure a vertical position of the wheel, wherein the controller is configured to calculate the vertical velocities by taking time derivatives of respective vertical position measurements from the one or more sensors.

19. The system of claim 12, wherein the active damping mechanism comprises at least one of a variable orifice, a hydraulically actuated cylinder, a cylinder actuated by a solenoid valve, an electromagnetically energized proportional-action valve, and a magneto-rheological fluid.

20. A method of controlling a vehicle suspension for a wheel via a controller, the method comprising:
   initiating a timer and maintaining a damping level of an adjustable damping mechanism of the vehicle suspension at an initial value;
   repeatedly calculating a vertical velocity of the wheel until the vertical velocity exceeds a velocity threshold and the timer does not exceed a time threshold, wherein at least one of the velocity threshold and the time threshold is varied on a basis of a speed of the vehicle; and
   in response to the vertical velocity exceeding the velocity threshold before the timer exceeds the time threshold, sending an adjustment signal to the adjustable damping mechanism of the vehicle suspension to increase the damping level.

21. A vehicle suspension system, comprising:
   an adjustable damping mechanism operatively coupled to a vehicle wheel; and
   a controller operatively coupled to the adjustable damping mechanism, the controller being configured to:
      initiate a timer and maintain a damping level of the adjustable damping mechanism at an initial value;
      repeatedly calculate a vertical velocity of the wheel until the vertical velocity exceeds a velocity threshold and the timer does not exceed a time threshold, wherein at least one of the velocity threshold and the time threshold is varied on a basis of a speed of the vehicle; and
      send an adjustment signal to the adjustable damping mechanism to increase the damping level in response to the vertical velocity exceeding the velocity threshold before the timer exceeds the time threshold.

22. A method of controlling a vehicle suspension, comprising:
   initiating a timer and maintaining a damping level of an adjustable damping mechanism at an initial value when a wheel vertical velocity exceeds a first velocity threshold; and
   increasing the damping level of the mechanism when the wheel vertical velocity exceeds a second velocity threshold before the timer exceeds a time threshold;
   at least one of the velocity and time thresholds being varied based on vehicle speed.

* * * * *